Figures 1, 2:
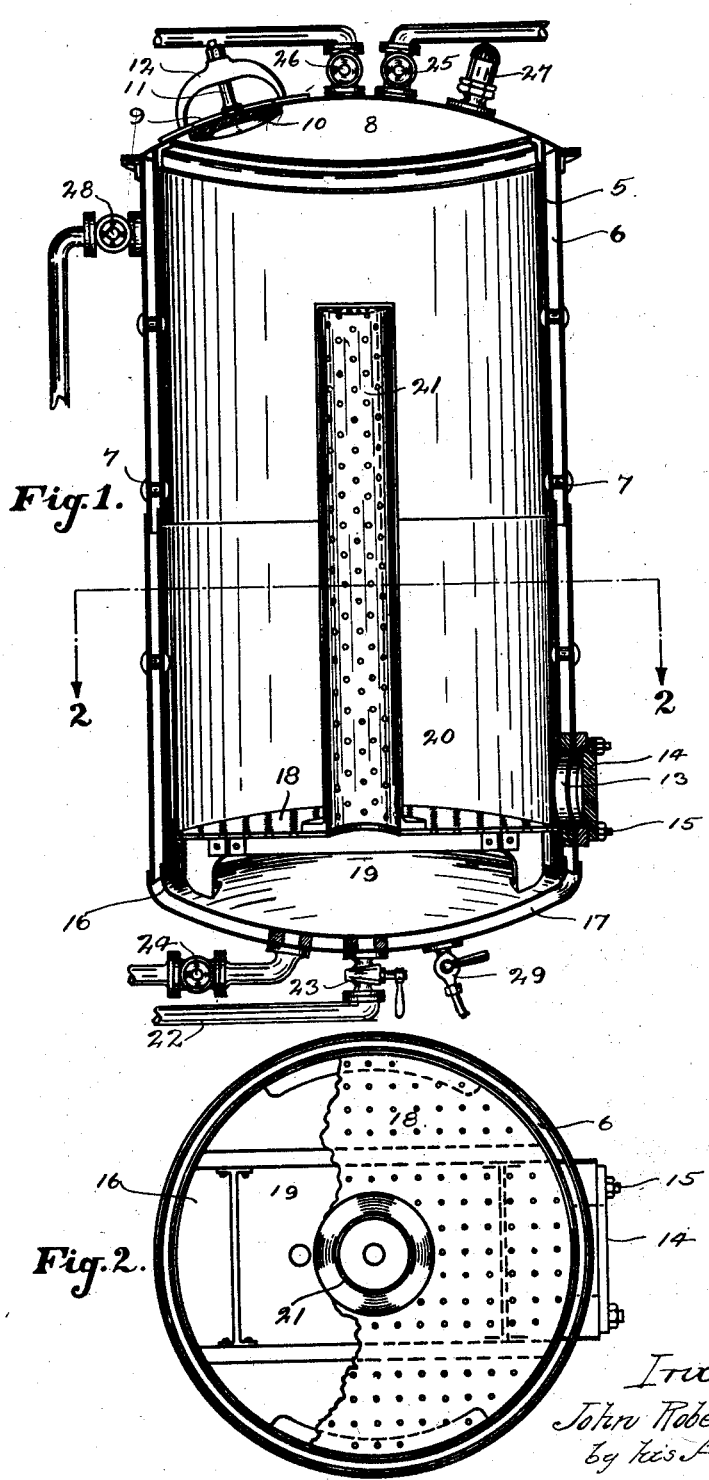

Inventor:
John Robert Cullen,
by his Attorneys
Howson + Howson

Patented Nov. 24, 1931

1,833,826

UNITED STATES PATENT OFFICE

JOHN ROBERT CULLEN, OF FIVEDOCK, NEAR SYDNEY, NEW SOUTH WALES, AUSTRALIA, ASSIGNOR OF ONE-HALF TO M. GEARIN & SONS LIMITED, OF MASCOT, NEAR SYDNEY, AUSTRALIA, A CORPORATION OF NEW SOUTH WALES

PROCESS FOR THE RENDERING AND/OR DIGESTING OF SUBJECTS CONTAINING FATS AND IN THE SEPARATING OF THE PRODUCTS FOR USEFUL PURPOSES

Application filed June 30, 1928, Serial No. 289,509, and in Australia September 26, 1927.

This invention relates to the rendering and digesting of subjects containing fats and particularly animal fats meat residues offal and or slaughter-house and like refuse generally also and primarily butchers shop refuse for the purpose of separating the valuable fats therefrom and for the purpose of grading the residual meaty parts thereof and the nitrogenous and phosphoric properties of the bone parts and converting these into food for animals and for the purpose of converting into fertilizers any remainder unsuitable for such food. And this invention has been specially devised to achieve the stated objects by a simple process and in peculiarly constructed simple apparatus and this without destroying or disassociating therefrom the gelatinous and nitrogenous constituents of such material but retaining them in the meaty products and such process being generally more economical effective and hygienical than those heretofore devised besides producing a higher percentage of food fats and fertilizers.

According to this invention the process is applied in a plant or apparatus comprising a new and improved vessel or digester which is a vertical stationary jacketed or double walled cylinder having preferably a similarly jacketed bottom wall and the inner barrel of which is the cooker or digester proper while the jacket is for the heating steam. In the barrel is an interstitial diaphragm or screen dividing or separating the lower part or "depositary" of the barrel from the major upper part or "cookery" said depositary being of such capacity in proportion to the cookery to hold all the fats rendered and on this diaphragm are erected pierced draining tubes or cones which preferably are of interstitial material and preferably are removable to facilitate charging and discharging the barrel.

The digester has a feeding orifice of suitably large size through its unjacketed top wall and also has a discharge orifice with cover from the barrel through the annular jacket at a joint just above the diaphragm. A blow down or discharge valve is provided through the bottom wall at the lowest point below the diaphragm and the digester has also a steam supply service with valve thereon and the top wall has a vent with a control valve and a safety valve. A pipe leads from said vent to a condenser and preferably there is an exhaust service to a suction pump or vacuum tank. The jacket also has a convenient steam service and control valve and as well has a bottom drain pipe with steam trap.

But in order that this invention may be readily carried into practical effect it will now be described with reference to the drawings accompanying and forming part of this complete specification and which are more or less schematic. Fig. 1 is a sectional elevation of the digester and Fig. 2 is a sectional plan on line 2—2 Fig. 1.

The digester is a doubled wall cylinder forming a barrel 5 with an annular jacket 6 and it is suitably stayed as at 7 and supported vertically by suitable means (not shown). The digester top 8 is preferably unjacketed and has through it a charging orifice 9 and its steam tight door 10 has locking bolt 11 in bridge 12. A discharging orifice 13 from the barrel 7 is through the jacket 6 and it has a steam tight door 14 with locking bolt 15. The digester bottom 16 is a double walled forming jacket 17 open to the jacket 6. The barrel 5 has an interstitial diaphragm or screen bottom 18 separating depositary 19 from cookery 20 on which stands a draining tube or cone 21 say of interstitial material which are so positioned as to insure and facilitate effective complete drainage of the cookery charge on the diaphragm 18 and to prevent solid packing of the material. A discharge pipe 22 from the bottom of the depositary 19 passes through the jacket 17 and has thereon a blow down or discharge valve 23. In the digester bottom 16 is a steam supply valve 24 and in the top 8 is preferably an additional supply valve 25 a blow off valve 26 and a safety valve 27. A valve 28 on the jacket admits steam to the jacket 16—17 and there is a drain pipe and cock 29 from said jacket which in practice leads to a steam trap (not shown).

To render and digest fat containing subjects according to the before described process the barrel 5 is charged to its near-capacity or otherwise with said subject and the doors 10 and 14 tightly closed. Steam is admitted both to the barrel and to the jacket through the valves 24 and 28 but at different degrees of pressure or heat providing that the heat in the barrel is considerably lower than the heat in the jacket the barrel steam preferably being a reduced pressure steam and which to reduce its pressure is passed through a reducing valve and is owing to such action a much drier steam. And it has been found in practice when treating edible materials that in the barrel 5 a pressure of the order of five (5) to twenty (20) pounds per square inch is most efficient when at the same time in the jacket a pressure in excess thereof by say twenty pounds per square inch is maintained, though for treating inedible material these pressures are proportionately increased to say forty (40) to eighty (80) pounds per square inch in the barrel and in the jacket respectively.

The steam admitted to the barrel 5 continuously flows or percolates through the charge and freely exhausts through blow off valve 26 further steam entering and taking its place. The continuous admission and exhausting of the steam in the charge and this as before stated at a substantially lower temperature pressure than in the jacket ensures a preventative or corrective to excessive superheating owing to radiation of heat from the jacket steam inwardly and consequent deterioration of the fat in the material and as well prevents the material baking to or sticking to the wall of the digester. At the same time the proportionally higher pressure with consequently higher temperature of steam in the jacket practically prevents condensation (while the material is being rendered) by vaporizing the fluids contained in the charge which vapours with any putrescible and or other noxious gases arising from the material mingle with the barrel steam and escape with it. Further the higher pressure with consequently higher temperature attained in the jacket is arranged to increase the heat of the barrel steam (not superheat) just sufficiently to thoroughly cook the material. It is important that water or liquid be separated from the material being treated for such water or liquid being a great solvent dissociates the sulphur compounds from the material forming sulphuretted hydrogen ($H_2S$) which as well as being noxious is detrimental to the charge and to the digester. And again the absence of condensation in the barrel ensures that the gelatinous and or nitrogenous constituents of the charge are not separated therefrom or dissolved and that the treated material may be removed from the barrel practically dry while the gelatinous matter in such material will bind the whole together so that it will after short exposure to the atmosphere or a very short period in driers become dissicated and brittle and grindable. As rendering proceeds the heat of the barrel and the steam percolating upwardly through the material releases the fats from the digesting charge and without scorching, these fats owing to the comparatively low temperature of the process and said fats, passes through the tube 21 and the diaphragm 18 into the depositary 19 and are blown therefrom from time to time by closing the steam supply valve 24 opening steam supply valve 25 and opening of the blow down valve 23. Fats obtained by this process are immediately ready for commercial use being practically separated from the meat juices and or other emulsified matter usually found in fats rendered by process heretofore and such fats rarely require further treatment or even washing.

As in all cooking tests of the charge must be made from time to time as to its sufficiency and a specimen of the being treated charge should be withdrawn at intervals from the barrel and an experienced attendant will quickly adjudge therefrom the next withdrawal of a specimen or as to whether the cooking is complete. When this stage is reached the steam supply to the barrel is stopped and preferably a suction from the suction pump applied thereto to draw the moist steam therefrom; when the charge is removed the drying is completed either in the open air or driers and depending on the quality of the charge that is if the bone constituents were green the whole may be ground into food or if the bones are bleached or otherwise low in nitrogen the charge is passed over sieves and such bones extracted for grinding into fertilizers.

I claim:—

1. A process for rendering and digesting matter containing fats, said process consisting in heating the matter in an externally heated digester of the steam jacketed type in the presence of a continuous flowing current of new steam passing through the charge of matter in the digester, the steam being of such dryness, temperature and pressure as will absorb the gases of the matter under treatment, render the fats contained in the matter, vaporize the moisture of the matter, and exhaust the resultant vapors from the digester; draining the resultant fats from the charge; discharging such fats from the digester; and continuing the passing of the steam through the charge until the residual matter is digested; the steam passing through the steam jacket for heating the charge of matter in the digester being at a considerably greater pressure than the steam flowing through the charge of matter within the digester.

2. A process for rendering and digesting matter containing fats, said process consisting in heating the matter in an externally heated digester of the steam jacketed type in the presence of a continuous flowing current of new steam passing through the charge of matter in the digester, the steam being of such dryness, temperature and pressure as will absorb the gases of the matter under treatment, render the fats contained in the matter, vaporize the moisture of the matter, and exhaust the resultant vapors from the digester; draining the resultant fats from the charge; discharging such fats from the digester; and continuing the passing of the steam through the charge until the residual matter is digested; the steam passing through the charge within the digester ranging from five to forty pounds per square inch, while the steam passing through the jacket of the digester ranges proportionately thereto from thirty to eighty pounds per square inch.

In testimony whereof I have signed my name to this specification.

JOHN ROBERT CULLEN.